United States Patent
Zou et al.

(10) Patent No.: US 8,990,591 B2
(45) Date of Patent: Mar. 24, 2015

(54) POWER MANAGEMENT SYSTEM FOR SELECTIVELY CHANGING THE POWER STATE OF DEVICES USING AN OS POWER MANAGEMENT FRAMEWORK AND NON-OS POWER MANAGEMENT FRAMEWORK

(75) Inventors: Peng Zou, Portland, OR (US); Joseph T. Dibene, II, Olympia, WA (US); Fernardi Thenus, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 276 days.

(21) Appl. No.: 12/724,084

(22) Filed: Mar. 15, 2010

(65) Prior Publication Data
US 2011/0161683 A1 Jun. 30, 2011

Related U.S. Application Data

(60) Provisional application No. 61/335,153, filed on Dec. 31, 2009.

(51) Int. Cl.
G06F 1/00 (2006.01)
G06F 1/32 (2006.01)
(52) U.S. Cl.
CPC ............ G06F 1/3203 (2013.01); G06F 1/3287 (2013.01); *Y02B 60/1278* (2013.01); *Y02B 60/1282* (2013.01)
USPC ............................. 713/300; 713/324; 713/323
(58) Field of Classification Search
CPC ................................ G06F 1/3203; G06F 1/3287
USPC ....... 323/282, 283; 361/18; 307/82; 713/320, 713/324, 322, 300, 323, 310, 340; 365/63
See application file for complete search history.

(56) References Cited

U.S. PATENT DOCUMENTS

| | | | |
|---|---|---|---|
| 5,640,573 A | 6/1997 | Gephardt et al. | |
| 5,752,046 A | 5/1998 | Oprescu et al. | |
| 5,752,050 A | 5/1998 | Hernandez et al. | |
| 6,105,142 A * | 8/2000 | Goff et al. | ...................... 713/324 |
| 6,646,425 B2 | 11/2003 | Miftakhutdinov | |

(Continued)

FOREIGN PATENT DOCUMENTS

| | | |
|---|---|---|
| CN | 101040241 A | 9/2007 |
| JP | H07-295695 A | 11/1995 |

(Continued)

OTHER PUBLICATIONS

International Search Report and Written Opinion received for PCT Patent Application No. PCT/US2010/059812, mailed on Aug. 29, 2011, 8 pages.

(Continued)

*Primary Examiner* — Thomas Lee
*Assistant Examiner* — Aurel Prifti
(74) *Attorney, Agent, or Firm* — Green, Howard & Mughal, LLP

(57) ABSTRACT

In some embodiments, the invention provides a higher efficiency, real-time platform power management architecture for computing platforms. A more direct power management architecture may be provided using integrated voltage regulators and in some embodiments, a direct power management interface (DPMI) as well. Integrated voltage regulators, such as in-silicon voltage regulators (ISVR) can be used to implement quicker, more highly responsive power state transitions.

21 Claims, 9 Drawing Sheets

(56) References Cited

U.S. PATENT DOCUMENTS

| | | | |
|---|---|---|---|
| 6,948,079 B2 * | 9/2005 | Zhang et al. | 713/300 |
| 7,012,408 B2 | 3/2006 | Chen | |
| 7,126,798 B2 * | 10/2006 | Piorun et al. | 361/18 |
| 7,609,047 B2 | 10/2009 | Ravichandran | |
| 7,642,672 B2 * | 1/2010 | Strauss | 307/82 |
| 7,650,519 B1 * | 1/2010 | Hobbs et al. | 713/300 |
| 8,063,618 B2 * | 11/2011 | Lam et al. | 323/282 |
| 8,332,552 B2 * | 12/2012 | Arimilli et al. | 710/62 |
| 8,566,628 B2 * | 10/2013 | Branover et al. | 713/323 |
| 2003/0115013 A1 | 6/2003 | Dendinger | |
| 2003/0226048 A1 * | 12/2003 | Nguyen et al. | 713/320 |
| 2005/0040810 A1 | 2/2005 | Poirier et al. | |
| 2006/0236139 A1 * | 10/2006 | Chang et al. | 713/300 |
| 2006/0288246 A1 * | 12/2006 | Huynh | 713/320 |
| 2007/0013080 A1 | 1/2007 | DiBene et al. | |
| 2007/0070673 A1 * | 3/2007 | Borkar et al. | 365/63 |
| 2008/0077816 A1 * | 3/2008 | Ravichandran | 713/324 |
| 2008/0080103 A1 * | 4/2008 | Paillet et al. | 361/18 |
| 2008/0263373 A1 * | 10/2008 | Meier et al. | 713/300 |
| 2008/0288799 A1 * | 11/2008 | Branover et al. | 713/323 |
| 2009/0044036 A1 * | 2/2009 | Merkin | 713/340 |
| 2009/0049314 A1 | 2/2009 | Taha et al. | |
| 2009/0138734 A1 * | 5/2009 | Uchida | 713/310 |
| 2009/0153109 A1 | 6/2009 | Koertzen | |
| 2009/0172424 A1 * | 7/2009 | Cai et al. | 713/300 |
| 2009/0259863 A1 * | 10/2009 | Williams et al. | 713/323 |
| 2009/0307509 A1 * | 12/2009 | Jenne | 713/322 |
| 2010/0058078 A1 * | 3/2010 | Branover et al. | 713/300 |
| 2010/0102790 A1 * | 4/2010 | Buterbaugh et al. | 323/283 |
| 2010/0135429 A1 * | 6/2010 | Nakajima | 375/295 |

FOREIGN PATENT DOCUMENTS

| | | |
|---|---|---|
| JP | H07-302133 A | 11/1995 |
| JP | H7-302139 A | 11/1995 |
| JP | 2008-507766 A | 3/2008 |
| JP | 2009-510617 A | 3/2009 |
| RU | 2267849 C1 | 1/2006 |
| WO | 2009/138953 A1 | 11/2009 |
| WO | 2011/081839 A2 | 7/2011 |
| WO | 2011/081839 A3 | 10/2011 |

OTHER PUBLICATIONS

International Preliminary Report received for PCT Patent Application No. PCT/US2010/059812, mailed on Jul. 12, 2012, 4 pages.

Office Action Received for Russian Patent Application No. 2011153305, mailed on Feb. 25, 2013, 5 pages of Russian Office Action and 4 pages of English Translation.

Office Action Received for Japanese Patent Application No. 2012-543301 mailed on Sep. 3, 2013, 2 pages of Office Action and 3 pages of English Translation.

Office Action Received for Korean Patent Application No. 10-2012-7015870 mailed on Sep. 25, 2013, 4 pages of Office Action and 4 pages of English Translation.

Office Action Received for Chinese Patent Application No. 201080029684.8 mailed on Dec. 4, 2013, 14 pages of Office Action and 21 pages of English Translation.

Dend et al., "Implementation of a Regulator in a Chip", vol. 27, No. 1, Mar. 2004, English Abstract Only.

Office Action received for Chinese Patent Application No. 201080029684.8, mailed on Jul. 2, 2014, 32 pages of Office Action including 20 pages of English Translation.

Office Action received for Japanese Patent Application No. 2012-543301, mailed on Mar. 18, 2014, 3 pages of English Translation and 3 pages of Office Action.

Notice of Grant received for Russian Patent Application No. 2011153305, mailed on Jul. 23, 2013, 8 pages of Notice of Grant.

* cited by examiner

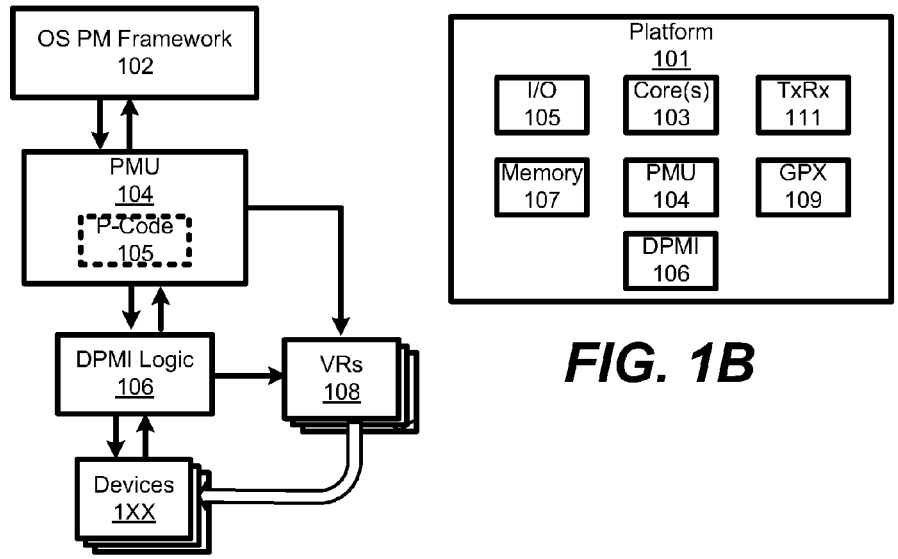
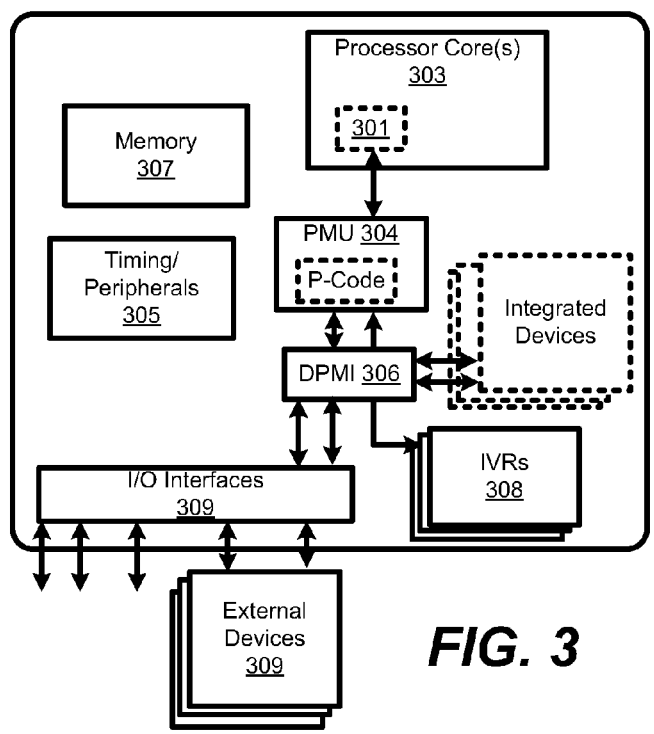
FIG. 1A
FIG. 1B
FIG. 3

POWER MANAGEMENT SYSTEM FOR SELECTIVELY CHANGING THE POWER STATE OF DEVICES USING AN OS POWER MANAGEMENT FRAMEWORK AND NON-OS POWER MANAGEMENT FRAMEWORK

The present application claims the priority filing date of earlier filed provisional patent application No. 61/335,153, filed on Dec. 31, 2009, and incorporated by reference herein.

TECHNICAL FIELD

The present invention relates generally to the supply of power to computing systems and in particular to an efficient platform power system, methodology, and architecture.

BACKGROUND

Existing operating system (OS) based power management schemes, such as ACPI (advanced configuration power interface) are OS centric. Platform and device power state transitions, when initiated from the OS power management software framework, typically must traverse down through the OS kernel stack, device drivers, platform firmware, and finally to the platform's power management unit (usually a controller) to execute power state changes. The reverse action, when initiated by a device, is also slow, typically having to traverse the same path in the reverse direction and then having to wait for authorization (or the like) from the OS. Such architecture implicates a lot of inefficiency and waste in terms of power usage. This may be tolerable with some technologies using conventional voltage regulator solutions, which can have relatively slow power state change response times and are difficult to integrate with other devices, e.g. GPS, Bluetooth, and USB devices. Accordingly, new approaches for power management in platforms with computing capability are desired.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 1A is a diagram of a generalized architecture incorporating a direct PMI (DPMI) power management capability in accordance with some embodiments.

FIG. 1B is a block diagram of a general platform amenable for implementing the DPMI based power management architecture shown in FIG. 1A in accordance with some embodiments.

FIG. 3 is a block diagram of an SoC platform with a DPMI architecture in accordance with some embodiments.

DETAILED DESCRIPTION

Figure 2:
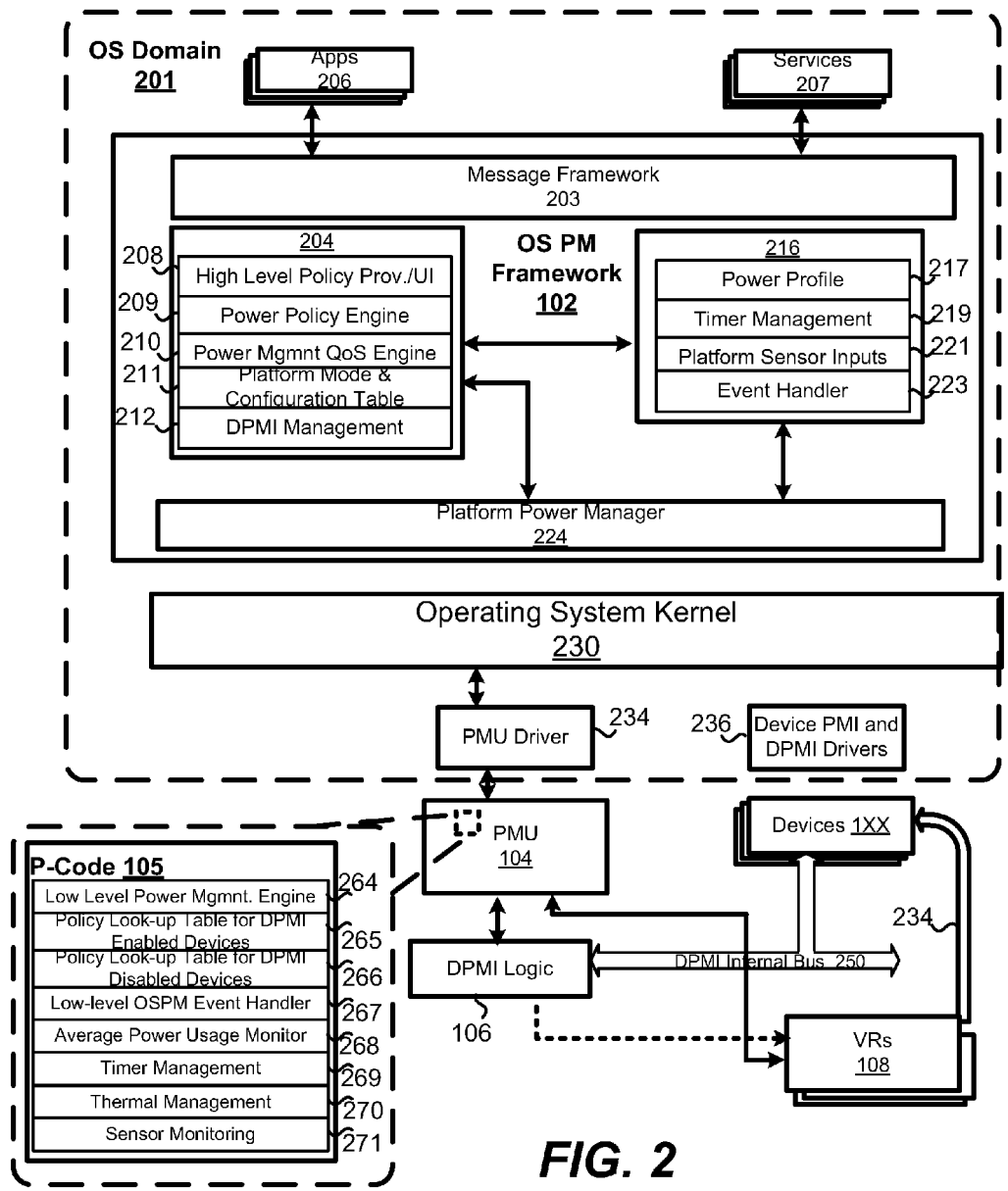
FIG. 2 is a diagram showing the power management framework of FIG. 1A but in greater detail in accordance with some embodiments.

In some embodiments, the invention provides a higher efficiency, real-time platform power management architecture for computing platforms. A more direct power management architecture may be provided using integrated voltage regulators and in some embodiments, a direct power management interface (DPMI) as well. Integrated voltage regulators, such as in-silicon voltage regulators (ISVR), discussed below, can be used to implement quicker, more highly responsive power state transitions. In addition, a new, more direct power management architecture (DPMI) may be employed to more efficiently manage the voltage regulators and/or ISVRs used for a platform.

In some embodiments, a DPMI may provide a hardware protocol enabling communications of activity status and power state change requests directly (i.e., more directly than with traditional OS based approaches) between devices and a power management unit (PMU), instead of having to traverse through a conventional OS based power management chain. This mechanism enables real-time power state control suitable for fast and integrated VRs, such as ISVR.

Unlike with existing operating system based power management approaches, platforms with a DPMI can more efficiently bypass the operating system to more quickly reduce power when appropriate, e.g., in response to a power state change or a device's notification that it is, or will be, less active or inactive. When IVRs are used, fast power state transitions can be achieved, for example, on the order of micro and even nano seconds, and they can be integrated into platforms including, into system on chips (SoCs) with other functional modules to have tighter and finer power delivery control. For example, with DPMI, IVRs can be integrated into functional devices to be rapidly, in almost a real-time fashion, put into or out of low power, sleep, or deep-sleep modes to achieve unprecedented power usage efficiency. This, for example, can be beneficial for mobile appliances such as netbooks, smartphones, and mobile internet device platforms.

In some embodiments, a direct power management interface (DPMI or direct PMI for short) architecture in the hardware layer of an IVR enabled platform is provided. As a system's power management unit (PMU) is integrated with IVRs, direct PMI can enable devices to communicate power state transition needs directly to the PMU (e.g., bypassing the OS), and the PMU can then execute power state changes without involvement of the OS and its power management framework, thereby speeding up power management and also saving power that may otherwise be used by the executing OS. Many (if not most) of the power management activities can essentially become transparent to the OS, thereby providing a more hardware centric power management architecture. The response time of power state changes can be improved, and the platform will typically require less CPU resources for power management activities. Therefore, the overall platform power usage efficiency can be improved.

FIG. 1A is a diagram of a generalized architecture incorporating a direct PMI (DPMI) power management capability. The depicted platform portion includes OS power management framework 102, a power management unit 104 (along with P-code 105), direct power management interface (DPMI) logic 106, voltage regulators 108, and devices 1XX, all coupled together as shown. The devices 1XX are powered by the VRs 108, which in turn, are controlled by the OS PM framework 102, PMU 104, and DPMI logic 106. The devices are referred to as "1XX" because they refer to various different devices or modules in a platform, or even external to it, some of which are illustrated in FIG. 1B.

In operation, the PMU (with aid from the DPMI logic 106) and OS PM framework work together to implement power management for the overall platform. The OS framework may be similar to existing OS PM framework but with DPMI specific additions, on top of the OS kernel. In some embodiments, users can choose to enable or disable the DPMI based power management functions. This can provide for back-compatibility of application software to the new DPMI implemented platforms.

A benefit of the PMU and DPMI, as taught herein, is that it can work within the framework of the OS power management 102 scheme or independent of it. So, for example, working within it, the OS may implement conventional power state schemes such as ACPI, etc. and at the same time, the PMU and DPMI logic can work to manage power on a lower level (higher granularity, faster response), in many cases, without having to go through the OS framework. The OS may be in a given power state (e.g., G state or s state) and the PMU 104/DPMI 106 may manage power for the devices accordingly. For example, depending on a given OS/system state, the PMU/DPMI might change device power states more slowly, more quickly, and/or differently, e.g., instruct something to stay on or off or in a reduced power mode for a longer or shorter time.

The PMU effectuates the power changes by way of its control of the actual supply levels coming out of the voltage regulators 108. It may set the levels based on the current power state, as well as on real-time events or condition changes, which it may be apprised of from the OS, from the DPMI, or from platform sensors or other information sources. The PMU 104 may be implemented with any suitable circuit or circuit module including but not limited to a microcontroller. The amount of power supplied by the VRs (usually controlled via adjustable supply voltage levels) is dictated by various factors, not the least of which are the power states for the system/platform/device, the specific activity (or inactivity) of a device, a device's expected upcoming activity, and other factors relating to power management efficiency. Policies for processing these, and other, factors to control the amount of power to be supplied by the VRs may be implemented by a combination of executable software or firmware (referred to as "P-code" 105) executing in the PMU and the DPMI logic 106.

The voltage regulators 108 may be implemented with any suitable combination of appropriate voltage regulators. Typically, buck type DC-to-DC converters are used, but they may be used in combination with other types of regulators. It is contemplated that several, if not many, VRs may be used to provide controllably variable supplies to separate devices of a platform. The regulators may be of different sizes and more than one may be used together, to define a VR domain, for supplying a given device.

In some embodiments, so-called in-silicon voltage regulators (ISVRs), may be used. They are discussed further below but generally provide for several, if not many, VRs to be substantially integrated into one or more chips that are disposed proximally to one or more chips providing the devices for which they power. In some embodiments, they may partially, or even wholly, integrated into the chips that have their associated devices to be powered.

The DPMI logic 106 serves to assist the PMU to more effectively, and efficiently, process messages from the devices, and in some embodiments, to process device messages directly, apart from the PMU. The DPMI logic 106 may be implemented with any suitable logic circuitry including but not limited to any suitable configuration of combinational logic, sequential logic, state machines, controllers, and/or any other suitable circuitry.

A drawback of traditional PMUs, implemented with micro controllers, is that they may have a difficult time servicing all of the different requests or notifications from the different devices at the same time in an efficient manner. For example, several devices may be finished with tasks and attempting to notify the PMU that they are idle and/or otherwise ready for a lower power state. The DPMI logic can function to more quickly administer such device traffic and forward it to the PMU in a desired fashion. For example, it may prioritize different messages, e.g., depending on the type of message or on from where it is being sent. Additionally, in some embodiments, the DPMI may be able to directly process messages such as power state change requests or workload notifications. The PMU and/or DPMI logic can process and/or implement state changes on a per device basis and at the same time, forward the changes to the OS so that the OS PM framework is able to manage power for the overall platform but at the same time, changes can be more quickly effectuated. This may result in incremental improvements in terms of saving power, e.g., getting into a lower power state mill-seconds faster than having to go through the OS, but such incremental savings will add up, over time and across the possibly many different operating devices.

FIG. 1B is a block diagram of a general platform amenable for implementing the DPMI based power management architecture shown in FIG. 1A. It comprises one or more cores 103, I/o devices/interfaces 105, memory devices 107, a graphics processor 109, transceiver devices 111, and a PMU 104 and DPMI 106 for managing VRs (not shown) for powering the devices including the one or more cores. Connection lines are not shown for simplicity since any or all of the devices may be connected, directly or indirectly, to each other, e.g., by way of one or more busses or point-to-point links, depending on particular applications and design choices. Likewise, the VRs are not shown since they are distributed throughout the platform (e.g., on a separate proximal chip or wholly or partially integrated into a primary chip of the platform) to form VR domains for supplying power to the various devices. Some VRs may be integrated into a chip or chips containing the various devices or they may be part of one or more separate modules proximal to a device for which they supply power.

The cores execute the OS PM framework and work together with the PMU and DPMI logic to control the various VRs supplying power to the devices. The platform could implement a personal computer, server, portable computing device such as a smart phone, netbook, tablet PC, or any other suitable computing apparatus.

FIG. 2 shows the power management framework of FIG. 1A but in greater detail. Along with the OS domain 201, shown are a PMU 104, with executable P-code 105, DPMI logic 106, voltage regulators 108, and devices 1XX, all coupled together as shown. Also shown is an internal DPMI bus 250 for linking the DPMI logic 106 to the devices 1XX. The DPMI logic is linked to device agents via device interfaces for communication over the bus 250 with the DPMI logic. (Although the term "bus" is used, it should be appreciated that links other than a bus or busses could be used. Such links include point-to-point links and even wireless links.)

In addition to the OS PM framework 102, the OS domain comprises applications 206, services 207, an operating system kernel 230, a PMU driver 234, and device PMI and DPMI drivers 236.

The OS PM framework 102 comprises message framework 203, various modules pertaining to or affecting power management 204, 216, and a platform power manager 224. The power management modules 204/216 include high-level policy provisioning/user interface module 208, power policy engine 209, power management quality of service (QoS) engine 210, platform mode and configuration table 211, DPMI management module 212, power profile module 217, timer management module 219, platform sensor inputs module 221, and event handler module 223.

The message framework 203 serves as an interface between executing applications 206 (CAD program, movie editor, etc.) and running services 207 (e.g., instant messenger, etc.) and the power management modules. From the applications and running services, the power management modules acquire power related information such as activity states, task duration estimations, etc. Depending on specific policies implemented in the power management modules 204/216, this information may be used for setting appropriate power states for the different platforms, e.g., from the platform as a whole down to device levels. The platform power manager 224 interfaces between the modules and the OS kernel 230. (It should be observed that shown and described here are aspects of the OS pertaining to power management; not all features of an OS are shown and described.)

The OS-PM framework 102 provides high-level policy management and configuration and determines power state transitions based, among other things, on application status and usage models. In this aspect, the OS PM framework will typically be back-compatible with existing OS PM implementations. Therefore, existing application software infrastructures can be supported by DPMI implemented architectures.

The DPMI manager 212 and user interface module 208 serve to activate or de-activate DPMI features of a given device. When a DPMI agent for a device 1XX is de-activated, such a device's power management mechanism will basically be the same as operating system implementations without DPMI. When a device's DPMI agent is activated, its power management can then be done, to a large extent, through the DPMI logic 106 and PMU P-code 105, and become largely transparent to the OS and the applications/services. In this case, the PMU 104 can still respond to power management directions from the OS PM framework 102, but a majority of power management activities happen between the PMU and the devices.

The device communicates activity status and power state change request to the PMU 104 in real-time, and the PMU can then quickly adjust the given supply rail (and possibly subsystems such as a clock tree, for example) to low power states, and "recover" to a higher power state as needed, thereby enabling the platform to achieve increased power usage efficiency. The DPMI enabled power management architecture improves power usage efficiency not only by quick power state transitioning, but also, by reducing computing resources and CPU usage needed by the OS PM framework.

To accommodate DPMI architecture extensions within existing OS PM framework, a power management QoS engine 210 has features to reflect power management modes when the DPMI is activated. Similarly, a platform mode & configuration table 211 may include modes for DPMI activated states, in addition to modes already defined for the existing OS PM.

A middle layer, between the OS PM framework 102 and hardware (PMU, devices, VRs, etc.) includes the PMU drivers 234 and device drivers 236. In some embodiments, these drivers may be implemented using firmware. The PMU driver 234 enables the PMU 104 to communicate with the OS and application/service software. It may be the primary (if not only) mechanism to channel power management instructions between the OS PM framework 102 and the PMU 104 for non-DPMI activated devices. For DPMI activated devices, the PMU may still communicate with the OS PM framework 102 power affecting events communicated between the OS PM framework 102 and PMU 104, while a majority of the power management requests may be exchanged through the DPMI infrastructure (PMU 104, DPMI logic 106, and the DPMI internal bus 250).

The device drivers 236 provide software hooks, enabling the OS and application software to configure devices in proper power management modes and to activate/de-activate their DPMI functionality.

The lowest DPMI layer in the depicted platform power management framework is the hardware layer, the PMU 104 with P-code 105, DPMI logic 106, VRs 108, and devices 1XX. The success of the hardware layer to implement fast power management responsiveness is based on tight integration of the PMU 104, VRs 108, and devices 1XX (e.g. Bluetooth devices, CDMA devices, USB devices, etc.) In some embodiments, many (if not most) of the devices will be integrated with the PMU and even to some degree, the VRs, onto a single SoC, in order to fully utilize fast and fine power rail control. Of course, there may be devices that are not integrated into such an SoC for a given platform. In those cases, some VRs in the SoC may be allocated to support power rails for external devices.

For non DPMI enabled devices, the PMU will likely primarily execute and handle power management instructions originated from the OS PM framework 102. However, for the DPMI enabled devices, the PMU function may be twofold. On the one hand, it continues to process power management directives originated from the OS PM. On the other hand, it additionally acts as an autonomous agent to directly manage device power states, through policies defined in the P-code 105 and in cooperation with the DPMI logic, without having to go through the OS PM framework.

The DPMI hardware essentially comprises DPMI logic 106, DPMI internal bus 250, and the DPMI agents in the devices. The internal bus 250 is shared among the integrated devices, and used to communicate device activity status and power state request to the PMU 104 through the DPMI logic 106. The DPMI logic 106, among other things, may manage internal and external DPMI bus communications, resolve bus contentions among devices, act as a hub for the power state change requests from the devices, and prioritize and communicate power state requests to the PMU 104. The DPMI logic 106 may also handle the DPMI extension port (shown in later embodiments) to enable external devices to be managed through DPMI protocol when their supply rails are supplied by VRs 108 such as when integrated with the PMU and DPMI controller.

The P-Code 105 functions as the low-level program for the PMU when implemented as a controller. (equivalent appropriate code/logic may be used for alternative PMU implementations.) It includes a low-level power management engine 264, a DPMI-enable device policy look-up table 265, a DPMI not-enable device policy look-up table 266, a low-level OS PM event handler 267, an average power usage monitor module 268, a timer management module 269, a thermal management module 270, and a sensor monitoring module 271. It can be seen that new functionality (e.g., DPMI related policy, event handling) may be integrated into conventional PMU functionality (e.g., thermal management, timing management).

The low-level power management engine 264 handles power state events communicated through the DPMI logic 106 and requests originated from the OS PM framework 102. Power state policy is built into the P-Code, among other ways, through lookup tables 265, 266 to enable quick power state changes. A specific power state for a given device normally fundamentally corresponds to a specific voltage setting, to be controlled by the PMU through a command or commands to the appropriate VR 108. The PMU processes power state change requests/commands from the OS PM framework or from the DPMI in accordance with predefined associations loaded into the policy lookup tables to set a targeted VR voltage setting. The P-Code also enables the PMU to track average power usage, e.g., for interested devices, using the average power usage monitor 268 and sensor monitoring modules 271.

FIG. 3 is a block diagram of an SoC platform with a DPMI architecture in accordance with some embodiments. It generally comprises one or more cores 303, a PMU 304, memory 307, timing/peripherals 305, DPMI logic 306, I/O interfaces 309, VRs 308, and integrated devices within the Soc that are powered by the IVRs 308. Also shown are external devices 311 whose power states may be controlled by the PMU 304 and DPMI logic 306. The SoC could be used for any suitable application such as for a netbook, a so-called smart phone, or any other appliance, especially portable appliances where power savings may be important.

The one or more processor core(s) execute an OS PM framework 301, which may be similar to that just described except that it may have more or less modules organized differently to accommodate particular design features of the SoC. Similarly, the PMU 304 (which includes P-code) and the DPMI logic 306 may also be implemented as described in the previous section. The integrated devices correspond to devices (functional units, modules) in the SoC that may be operated at controllably different power states. The IVRs 308 are the separate VRs or VR domains used to supply power to the devices, such that the supply for each device may be separately controlled. The IVRs may be implemented with VRs that are wholly or partially integrated, either into the SoC chip or onto a separate chip disposed proximal to the SoC chip, for example, as discussed below with respect to FIG. 7.

Figure 4:
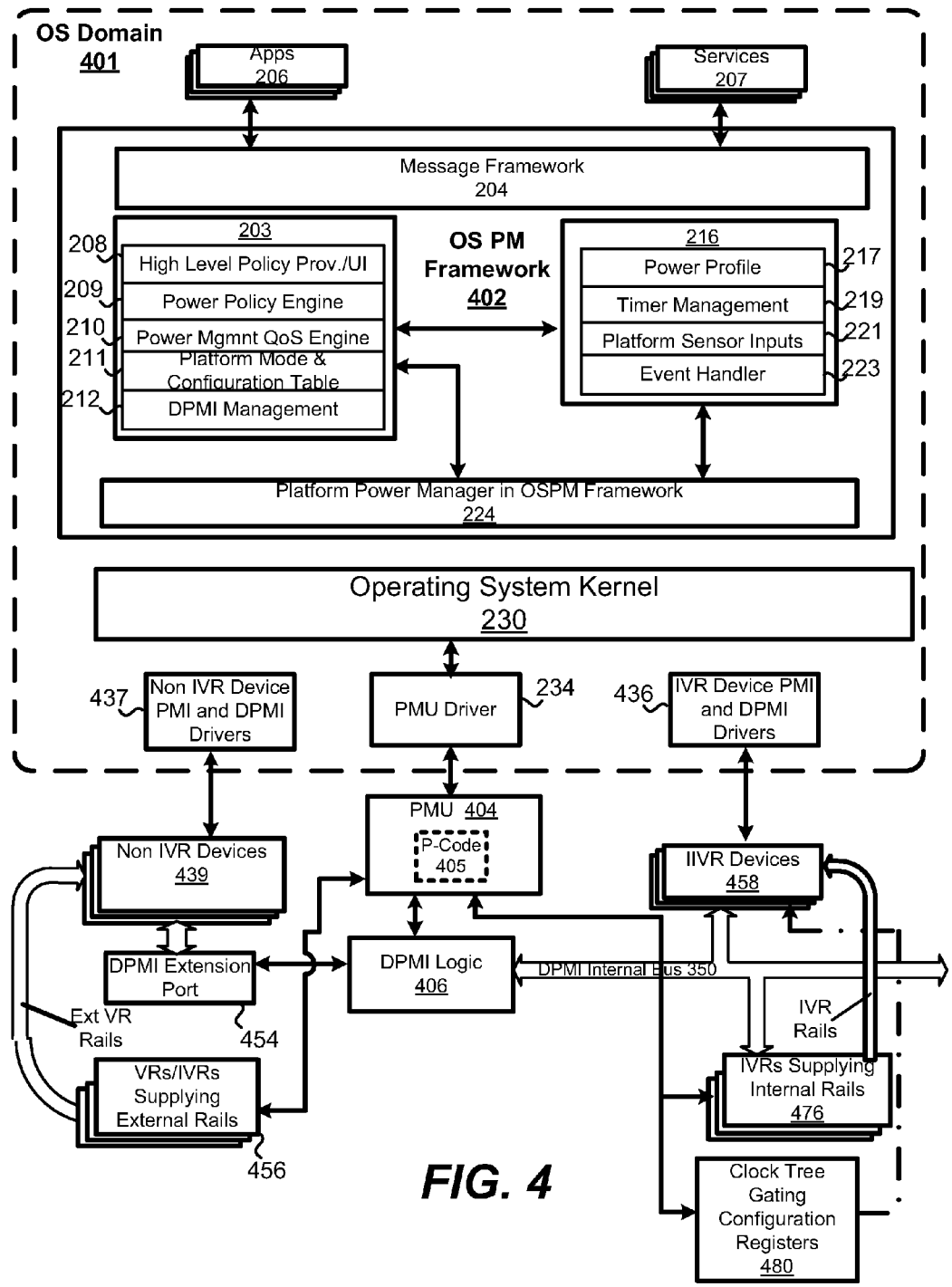
FIG. 4 shows an OS PM-DPMI architecture in accordance with additional embodiments

With reference to FIG. 4, an OS PM-DPMI architecture in accordance with additional embodiments is illustrated. This power management architecture may be used for the SoC of FIG. 3, as well as for other platforms, especially for those that are portable. This power management architecture is similar to that shown in FIG. 2, except that it additionally includes hardware and software for external devices, and it also specifically shows devices (external or internal) that may be supplied by IVRs 476 or by other VRs 456. It also includes clock tree gating configuration registers 480, which may be controlled by the PMU 404 for more efficient power management.

In this DPMI embodiment, VRs (IVRs) 476 are used for supplying power to internal, devices integrated with IVR within the same embodiment 458, and other VRs (e.g., IVR) 456 are used to supply power to devices not integrated with IVR within the same embodiment 439. To support the different device types (integrated with IVR and not integrated with IVR), separate PMI/DPMI drivers (436 and 437) are provided for the two separate paths to the OS PM framework 402. Also included is a DPMI extension port 454 for communication between the PMU 104/DPMI logic 406 and the not integrated devices 439.

The external DPMI port (bus or other interconnect) may be shared by external devices and may be used to communicate external device activity status and power state request to the DPMI logic 406. The DPMI based architecture provides the foundational infrastructure for integrating devices (both internal and external devices) into a higher efficiency DPMI framework, which enables third-party external devices to be integrated without having to sacrifice platform power usage efficiency, when the third-party external devices are able to include DPMI agents into their designs to indicate device activity status and power state requests to the DPMI logic. In some embodiments, the DPMI protocol may include a look-up table, e.g., in the P-code and/or DPMI logic, with pre-defined power state transition policies for a the devices. Third-party device vendors may be enabled to incorporate their power management policy information into the lookup tables, e.g., into platform P-code and thereby have the complete liberty to define power state transition strategy for their devices to achieve improved power usage efficiency.

Figure 5:
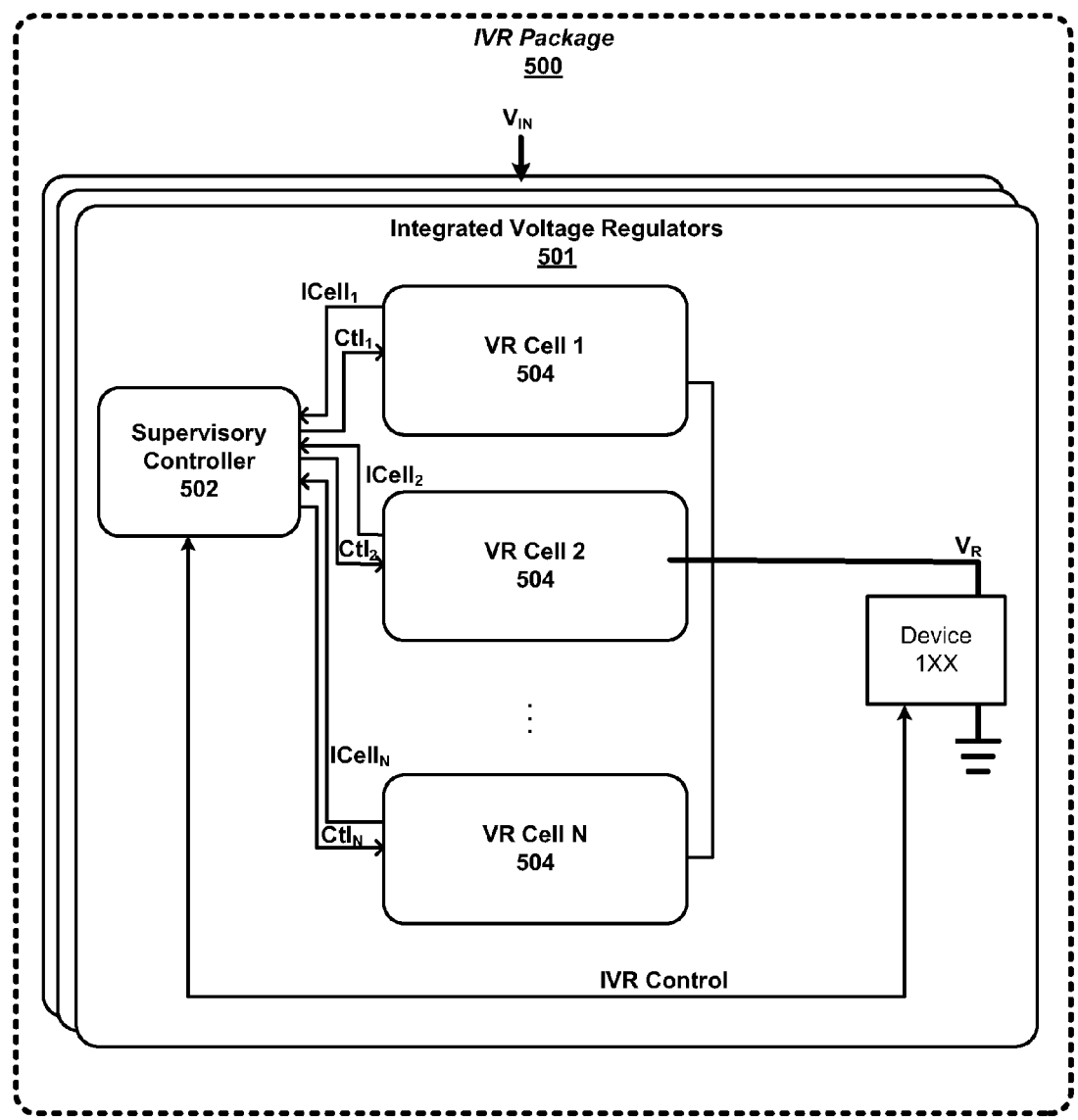
FIG. 5 is a diagram showing integrated voltage regulators in accordance with some embodiments.

FIG. 5 shows integrated (single or multi-cell) voltage regulators (IVRs) 501 in a platform package 500. Each VR 501 is coupled to provide a regulated voltage supply $V_R$ to a platform device 1XX. Each VR generally comprises a supervisory controller 502 and one or more voltage regulator (VR) cells 504 (VR Cell 1 to VR Cell N), coupled together as shown.

The individual VR cell outputs are coupled together to provide the regulated output supply voltage $V_R$. The supervisory controller 502 is coupled to the VR cells 504 to control the cells (to maintain a regulated voltage, as commanded by a PMU) based on load information from the individual cells (e.g., average per-cell current if generated in the cell or sampled current) and/or from the device load (e.g., output voltage, overall output current, and the like). It may be coupled to a PMU and/or to a DPMI logic to receive from it supply command (e.g., VID) and possibly other information to provide a suitable supply level to the device load.

In some embodiments, a DPMI logic may receive from the device (e.g., processor, transceiver, USB interface, audio codec, etc.) activity state information to control the cells based on the appropriate device activity state, as well as on its monitored current demand. In some embodiments, the supervisory controller may operate to engage a suitable number of cells (within a range determined from its device's activity state) based on the load current presently being consumed. The supervisory controller 502 may comprise any suitable circuitry to perform this function. For example, it could comprise a controller (or other processing unit circuitry); it could comprise discrete logic and analog components configured for the particular purpose of controlling the VR cells 504; or it could comprise a combination of logic elements, analog circuitry, and a more general-function controller circuit.

In some embodiments, each VR cell 504 may constitute an independently functioning voltage regulator with it's own controller and power conversion circuitry. For example, a VR 504 may comprise a controller coupled to an array of buck-type switches and output sections, arranged in a multi-phase configuration and coupled, as shown, to provide the regulated output voltage $V_R$. In some embodiments, the output sections could comprise coupled inductors, integrated into the IVR die and/or package. With coupled inductors, the saturation of an inductor is not substantially (if at all) dependent on the load current, resulting in the benefit that a power cell (VR cell 504) can supply a current above its continuous rating for a short duration of time, depending upon the particular thermal conditions and limitations.

In some embodiments, the VR cells 504 may be similarly designed with respect to each other, having comparable (if not equivalent) steady-state output current capabilities. For example, they could each be designed to operate efficiently and reliably in a range of between 1 Amps to 5 Amps, or 100 milli-Amps to 1 Amp, and to provide a regulated DC voltage of around 1 Volt or any specified voltage for a given device power state. In addition, they may be designed to operate at a sufficiently high switching frequency so that they can be dynamically engaged and disengaged, in accordance with the operating frequencies of the device load 1XX, to effectively counter dynamically changing load conditions. For example, sufficient response may be available with each cell having a switching frequency in the range of 20 MHz. to 100 MHz (or even higher), allowing for quick load response, e.g., in the tens of nanoseconds.

(Note that in the depicted embodiment, the VR cells including their inductors may be integrated into a single chip, e.g., into the platform's primary die or die and substrate, as may be the case with an SoC package. Alternatively, they could be part of a separate die that is disposed next to the device-including die and may be part of a common IC package having multiple dies. The proximity of the VRs, or VR domains, to their respective device loads may enable them to be driven in excess of 20 MHz, for example, without excessive switching losses.)

Figure 6:
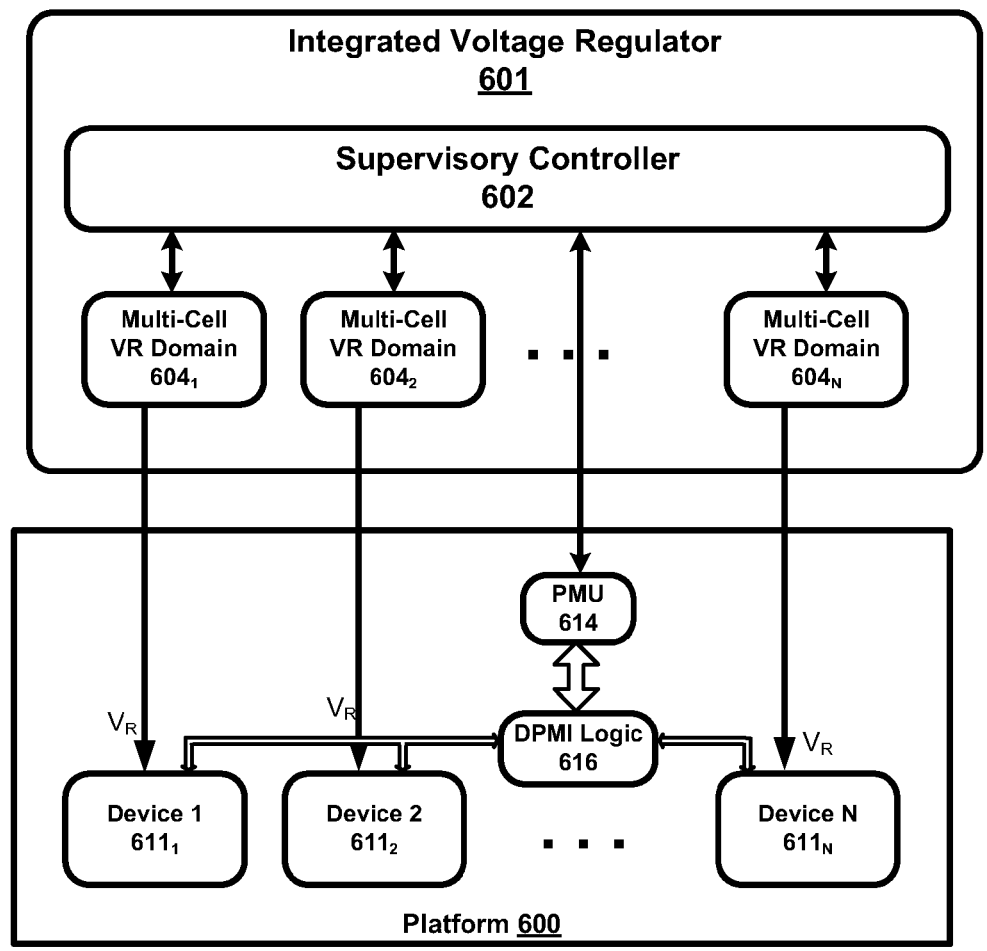
FIG. 6 is a diagram of a multi-cell IVR to provide regulated voltage supplies for associated devices in accordance with some embodiments.

FIG. 6 shows an embodiment of a multi-cell IVR 601 coupled to provide regulated voltage supplies for associated devices 611 in a DPMI implemented platform 600. The IVR 601 has multiple multi-cell VR domains 604 ($604_1$ to $604_N$), each comprising multiple cells as discussed above and each being coupled to an associated device 611 ($611_1$ to $611_N$) in the platform 600. Each IVR 604 comprises multiple cells that are controlled for efficient operation, e.g., pursuant to the routines of FIGS. 8 to 10, to provide a regulated voltage supply to its associated device. As with the IVR of FIG. 5, IVR 601 has a supervisory controller 602 to control each of the IVR domains 604 to enable and disable cells within the domain based on information from the PMU 614, e.g., based on device power status information provided by way of the DPMI logic 616.

Figure 7:
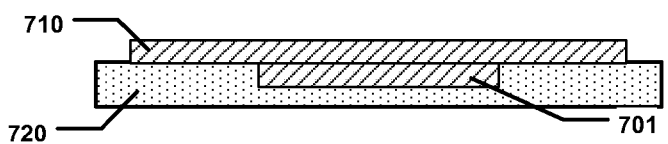
FIG. 7 shows a cross-sectional view of a platform package in accordance with some embodiments.

FIG. 7 shows a cross-sectional view of a platform package such as for an SoC or multi-core processor integrated circuit (IC). It comprises a multi-cell integrated voltage regulator (IVR) die 701 and a DPMI implemented platform die 710 coupled together as shown. The IVR die 701 is embedded within a package substrate 720, while the platform die is mounted to the substrate 720 and against the IVR die 701 for efficient signal conductivity. (In this embodiment, the substrate 720 serves as a package substrate for both the platform 710 and IVR 701. Note that the dies may or may not actually contact one another. They may have one or more other materials sandwiched between them throughout some or all of their abutting surface portions. Such materials could be used for structural stability, heat transfer purposes, power and signal grids, or the like.)

The IVR die 701 may comprise one or more multi-cell VR domains, while the DPMI platform die 710 may comprise one or more devices, as described above. With this package configuration, with the dies mounted next to one another, circuit elements for VR domains can be disposed more proximal to their associated devices. This can allow for sufficient conductive paths (e.g., via solder bumps or other contacts) to conduct relatively large amounts of current to the devices. (It should be appreciated that any suitable package configuration using one or more dies to implement the devices and VRs may be implemented and are within the scope of the present invention. For example, the IVR die could be "atop" the platform die instead of "below" it. Alternatively it could be next to it, partially against it, or they could be part of the same die.)

Figure 8:
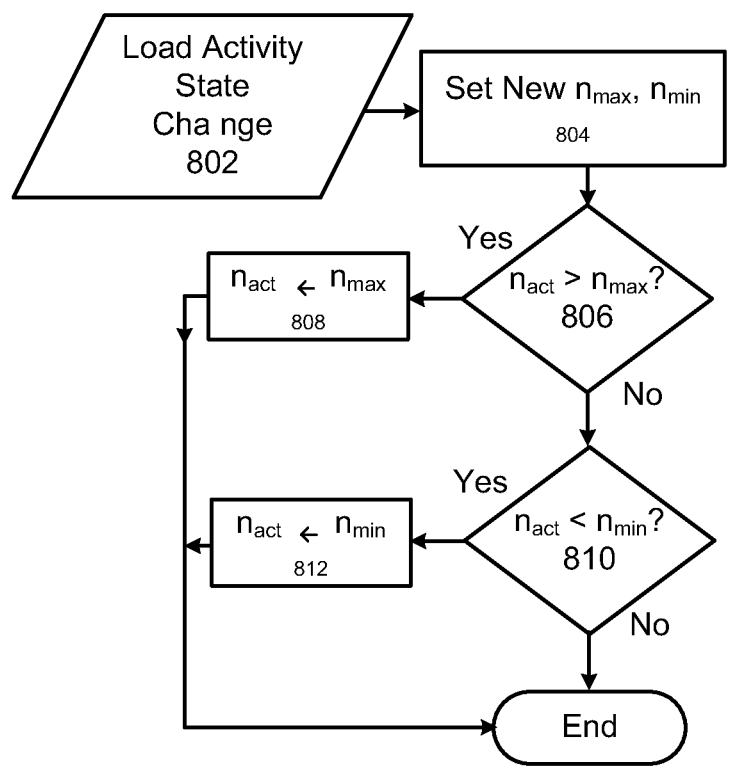
FIG. 8 is a routine for determining an allowable active cell range in accordance with some embodiments.

FIG. 8 shows a routine, which may be executed by a supervisory controller, for determining an allowable active cell range, i.e., a range of how many cells in a multi-cell VR may be active based on the activity state of its device, and for controlling the number of active cells so that they stay within the range. For example, this may be desirable to avoid adding or dropping too many cells in response to spurious load current changes for a given power activity state. The range limits, themselves, may be predetermined for each possible device/ system/platform activity state based on the expected maximum transient and static load conditions for the activity state.

The routine begins at 802 when an activity state change occurs, e.g., it may be communicated to the supervisory controller from a PMU in response to a request from a device. For example, with the device being a graphics processor, a device agent within the Graphics processor could communicate to DPMI logic a state change for the processor. At 804, new maximum and minimum limits ($n_{max}$, $n_{min}$) are set. Appropriate range limits could be determined using any suitable methodology. For example, they could be retrieved from a look-up table with the limits defined based on the load activity state.

If the present number of active cells ($n_{act}$) is outside of the range set by the limits ($n_{max}$, $n_{min}$), it gets updated by the routine. At 806, if the number of presently active cells ($n_{act}$) is higher than $n_{max}$, then at 808, $n_{act}$ is changed to $n_{max}$ and proceeds to the end of the routine, until the activity state changes once again. If not, it proceeds to 810 and checks to see if $n_{act}$ is too low, indicating that the cells are operating at an insufficiently low efficiency. If $n_{act}$ is lower than $n_{min}$, then at 812, $n_{act}$ gets changed to $n_{min}$ and the routine proceeds to the end and awaits another state change.

Figure 9:
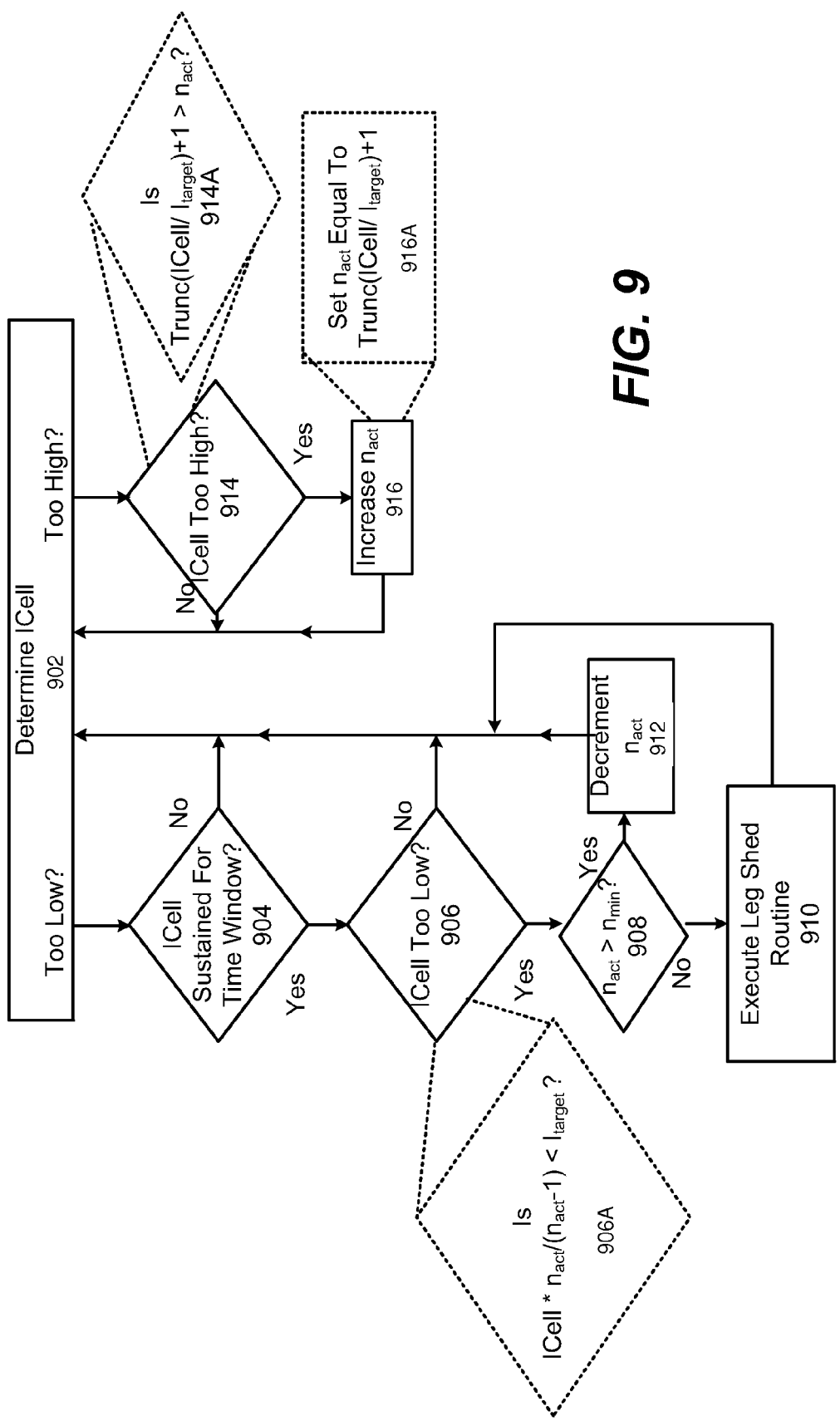
FIG. 9 shows a routine for determining the number of cells that should be active based on the allowable active cell range in accordance with some embodiments.

FIG. 9 shows a routine for determining the number ($n_{act}$) of cells that should be active based on the allowable active cell range (e.g., as discussed in the previous section) and on a current-per-active-cell (ICell) value. As used herein, the term "current-per-active-cell" and thus "ICell" refers to a current (load current) value, e.g., a current estimation, calculation, measurement, or combination thereof, corresponding to current in an active cell. This value may be attained, directly or indirectly, in a variety of different ways. For example, if the cells are sufficiently balanced with respect to each other, a sample or average value from any of the active cells may suffice. On the other hand, if they are not sufficiently and reliably balanced, then an average or sample from a worst-case cell (e.g., cell with maximum current) may be used. In addition, it doesn't necessarily matter whether the overall output load current or the current for a cell is used. For example, a supervisory controller could acquire a value for the overall output current and either control it directly against a target (or target range), or it could calculate from it an average current per active cell from this value, e.g., if it could be properly assumed that the cell loads are balanced, and then control it against a per-cell current target. In addition, a current or current signal may not actually be calculated or monitored. That is, a voltage (or other) signal, correlating to current, could be used. Accordingly, it should be clear that a particular type of or method for obtaining a current-per-active-cell (ICell) value is not required to practice the teachings of this invention, and thus, the invention is not so limited.

FIG. 9 shows a routine to control ICell to approach a target current ($I_{target}$), which in this embodiment, is the same for every operating activity state. (Remember that the power conversion efficiency for each cell is not affected by the amount of overall load current but rather, by the current provided by the cell.) If the current-per-active-cell (ICell) is too low, it attempts to decrease the number of active cells ($n_{act}$) to increase the current-per-active-cell, and if it is too high, it attempts to increase the number of active cells to decrease the current-per-active-cell.

Initially, at 902, it determines a current-per-active-cell (ICell) value (e.g., highest cell current of the active cells). From here, there are two paths (Too Low, Too High) that may execute simultaneously. With the first (Too Low) path, the routine determines at 904 if the ICell value is sustained for a sufficient amount of time, i.e., over a sufficient window. It does this for stability purposes to avoid dropping cells in response to short-lived droops. If ICell is at (or below) a given value for a sufficient amount of time, then at 906, it determines if this ICell value is too low. For example, as indicated at 906A, in determining if ICell is too low, the routine could adjust ICell by an amount that is inversely proportional to the number of active cells to bias it in favor of making it more difficult to drop a cell as $n_{act}$ decreases. At 906A, ICell is multiply by $n_{act}/(n_{act}-1)$ to so bias it.

Figure 10:
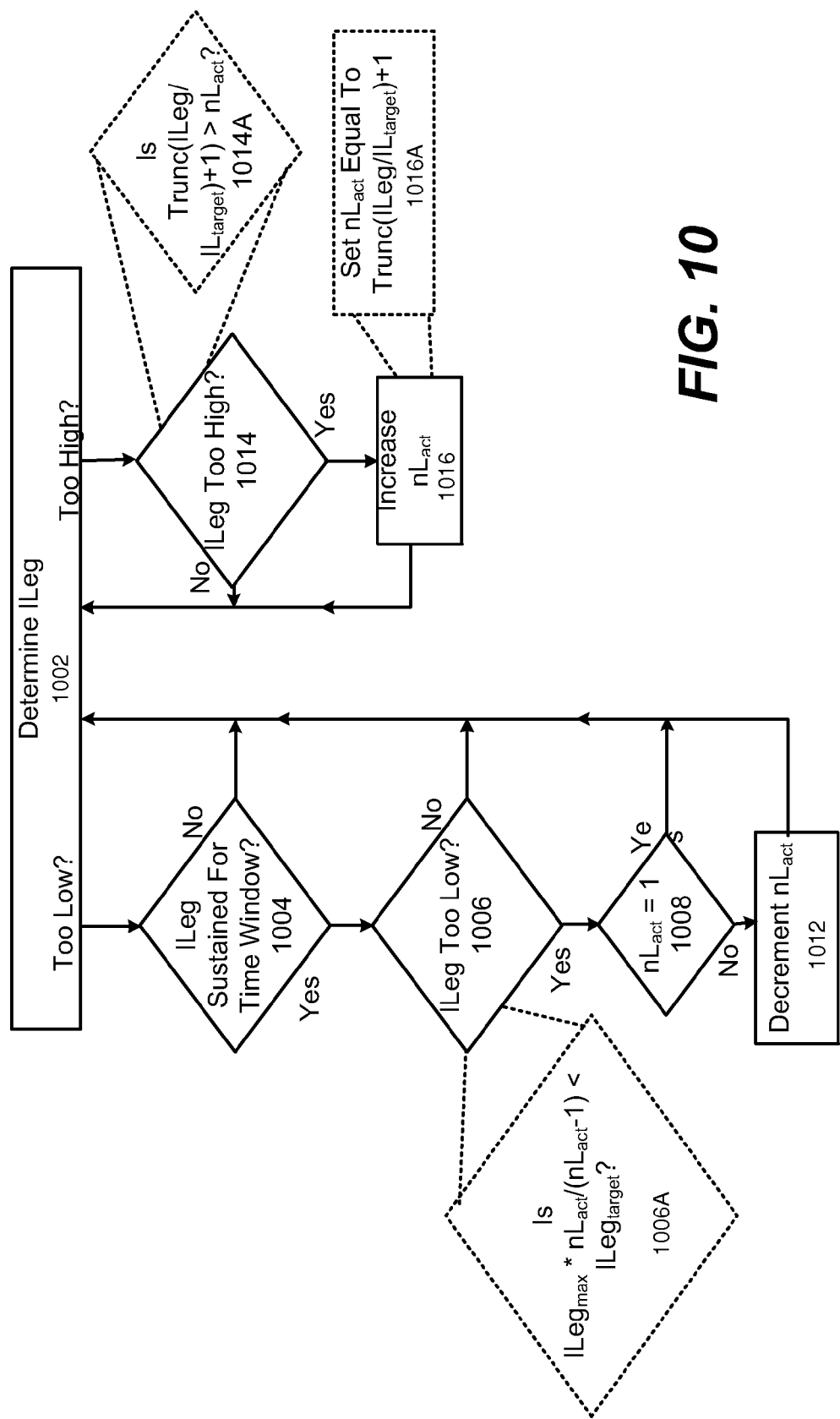
FIG. 10 shows a routine for determining how many switch legs should be active in an active cell in accordance with some embodiments.

If ICell is not too low, then the routine returns to 902, but if ICell is in fact too low, then at 908, it checks to see if the number of presently active cells ($n_{act}$) is greater than $n_{min}$. If $n_{act}$ is greater than $n_{min}$, then the routine proceeds to 912 and decrements $n_{act}$, i.e., drops a cell and returns back to 902. However, at 908, if $n_{act}$ was determined not to be greater than $n_{min}$, then the routine goes to 910 (maintaining $n_{act}$ at its present level) and causes a switch-leg shedding routine to be executed. With switch-leg shedding, power can additionally be saved by dropping one or more switch legs in active cell(s). An example of such a routine is shown in FIG. 10. From here, the routine returns back to 902.

(Switch leg shedding involves disabling one or more switch legs that are coupled in parallel with each other to control the power that is provided to a phase leg, e.g., to the inductor in the phase. This is contrasted from phase shedding where phase legs are dropped. With switch leg shedding, the phases remain active, but the size of the bridge, or switch, transistors are effectively adjusted to decrease or increase bridge impedance to improve the bridge efficiency as a function of load current. This is done by enabling or disabling selected combinations of the parallel switch legs that make up the bridge. An advantage of switch leg shedding versus phase shedding is that it is transparent to circuit operation and can more effectively be used with coupled inductors)

The "Too High" path from 902 will now be described. At 914, the routine determines if the ICell value is too high. (Note that it does not first confirm, unlike with the other path, that an ICell value is sustained for a sufficient amount of time because, in this embodiment, it is to respond as quickly as is reasonably possible to compensate for, e.g., instantaneous and sustained load line increases. With this in mind, the logic, e.g., dedicated logic circuits, for executing the actions in this path may be particularly designed for fast processing.)

An example of a way to determine if ICell is too high is shown at 914A. Here, the routine determines if a truncated value of (ICell/Itarget)+1 is greater than $n_{act}$. (Note that it is biased in favor of determining that ICell is too high, which will result in a cell or cells being added.) If ICell is too high, then at 916, the number of active cells is increased. For example, at 916A, the value of $n_{act}$ is set to the truncation of (ICell/$I_{target}$)+1. In this way, $n_{act}$ can be increased by more than 1 to quickly compensate for current spikes. In other embodiments, $n_{act}$ could simply be incremented or increased using another method. After $n_{act}$ is increased, the routine returns back to 902.

Disabling cells is an effective way of improving efficiency. However, as encountered at 910 above, once the minimum number of active cells has been reached, then adjusting the size of the active cell's transistor bridge (i.e., decreasing the number of active switch legs in their bridges) is another way to improve efficiency. This may be implemented in the controllers of the remaining active cell(s). A routine for changing the number of active switch legs in a cell may be similar to that for changing the number of cells, as is reflected in the routine of FIG. 10.

FIG. 10 shows a routine for determining how many switch legs should be active in an active cell. This routine is similar to the routine of FIG. 9 and thus it will not be discussed in as much detail. ILeg is akin to ICell and is the per-switch-leg current in the cell, and $nL_{act}$ is the number of presently active switch legs. (As with ICell, ILeg may be determined in a variety of different ways and could correspond to the overall cell current rather than having to be a leg current. That is, instead of ILeg being an actual per-leg current, it could correspond to the overall cell output current with $I_{target}$ being appropriately adjusted.)

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

Figure 11:
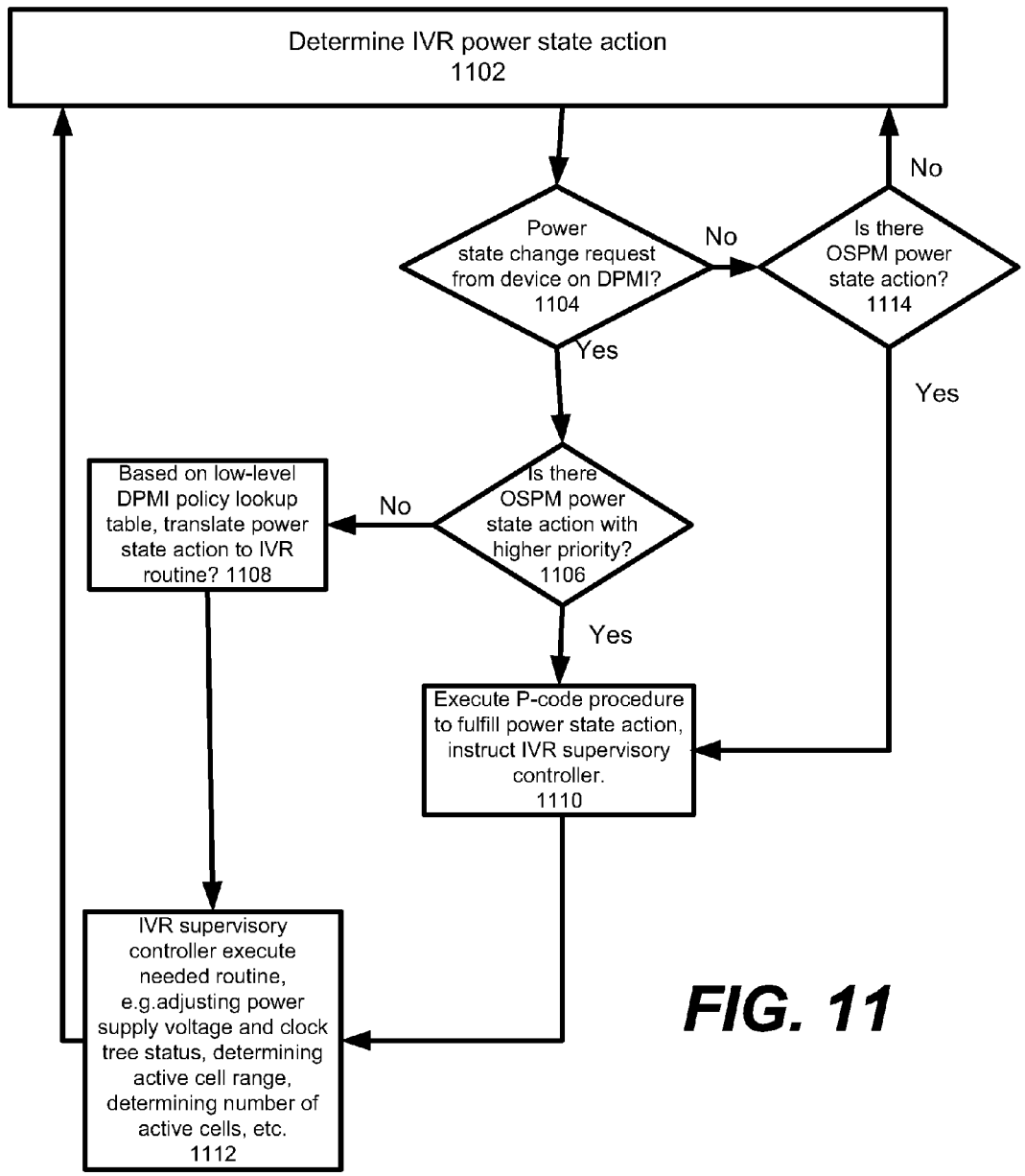
FIG. 11 is a routine showing how the PMU may determine an appropriate IVR power state action in accordance with some embodiments.

FIG. 11 shows a procedure of how the PMU determines an appropriate IVR power state action based on power state communications from the DPMI. The IVR routines given in FIGS. 8, 9, and 10 are examples of such power state actions executed by IVR's supervisory controller to achieve high power usage efficiency.

Initially, at 1102, PMU inquires DPMI logic on any power state event. From here, it checks if there is a power state change request received by DPMI, at 1104. If there is no power state event communicated over DPMI, it continues to inquire if there is a power state event from OSPM framework at 1114. At 1114, if there is no OSPM power state event, it goes back to the entry point 1102. From 1114, the procedure follows the flow to 1110 and executes a proper P-code procedure to fulfill OSPM power state requests, and instruct the IVR's supervisory controller on the needed IVR routines. Following 1110, the IVR executes the chosen action at 1112, e.g. adjusting power supply voltage/clock, tree status, determining active IVR cell range, etc. The routine then goes back to the entry point 1102 from 1110. At 1104, if there is a DPMI power state event, the routine then goes to the procedure at 1106, which determines if there is an OSPM power state event with higher priority than the DPMI event. If an OSPM power state event has higher priority (e.g., based on a predetermined policy), the routine continues to 1110 to fulfill the OSPM request. If a DPMI power state event carries higher priority at 1106, it moves to procedure 1108, and the PMU checks the policy lookup table to determine proper IVR actions for the power state request for the device originating such event over the DPMI. It then instructs the IVR's supervisory controller on the needed IVR actions. From 1108, the procedure flows to 1110, and the IVR supervisory controller carries out the needed routines.

The example routine given in FIG. 11 is executed continuously, then the power state requests originated from devices over DPMI or power state events originated from OSPM will be handled following predetermined priority order. The IVR supervisory controller is instructed to execute the needed actions, and fulfill the platform power management objective to maintain high power usage efficiency.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. An apparatus, comprising:
one or more processor cores to execute an operating system (OS) with a power management framework;
a power management unit (PMU); and
a direct power management interface (DPMI) coupled to the PMU to bidirectionally communicate power state messages between the PMU and devices,
the PMU to receive a DPMI power state change request for a first device of the devices from the DPMI and to receive an operating system power management (OSPM) power state change request, the PMU to compare the DPMI power state change request and the OSPM power state change request for priority, the PMU to generate an instruction to fulfill the OSPM power state change request when the OSPM power state change request has priority over the DPMI power state change request, and the PMU to determine a power state change for the DPMI power state change request when the DPMI power state change request has priority over the OSPM power state change request, the instruction or the power state change to control an amount of power supplied to the first device, wherein the PMU can issue the instruction or the power state change outside of the OS power management framework.

2. The apparatus of claim 1, wherein the direct power management interface comprises logic to process power state change request messages from the devices.

3. The apparatus of claim 2, wherein the power state change request messages include a request for reduced power.

4. The apparatus of claim 2, further comprising:
an internal bus to communicatively link the direct power management interface to the devices.

5. The apparatus of claim 1, wherein the devices comprise internal devices on a chip comprising the PMU.

6. The apparatus of claim 1, wherein the devices comprise external devices coupled to the PMU via an input/output interface.

7. The apparatus of claim 1, further comprising:
internal voltage regulators on a chip comprising the one or more processor cores.

8. The apparatus of claim 7, wherein each of the devices has an associated one or more internal voltage regulators.

9. The apparatus of claim 1, wherein the PMU comprises executable software or firmware (P-code) to generate the instruction to fulfill the OSPM power state change and a policy look up table to determine the power state change for the DPMI power state change request.

10. A computing platform, comprising:
one or more processor cores to execute an operating system (OS) with a power management framework;
a power management unit (PMU);
a direct power management interface (DPMI) coupled to the PMU to communicate power state messages between the PMU and devices, the PMU to control the amount of power supplied to the devices, wherein the PMU can issue power state changes outside of the OS power management framework and the DPMI can process power state change request messages from the devices, the PMU to compare a DPMI power state change request for a first device of the devices and an operating system power management (OSPM) power state change request for priority, the PMU to generate an instruction to fulfill the OSPM power state change request when the OSPM power state change request has priority over the DPMI power state change request and the PMU to determine a power state change for the DPMI power state change request when the DPMI power state change request has priority over the OSPM power state change request, the instruction or the power state change to control an amount of power supplied to the first device of the devices, wherein the PMU comprises executable software or firmware (P-code) to generate the instruction and a policy look up table to determine the power state change associated with a power state change.

11. The computing platform of claim 10, wherein the direct power management interface comprises logic to process power state change request messages from the devices.

12. The computing platform of claim 11, wherein the power state change request messages include a request for reduced power.

13. The computing platform of claim 11, further comprising:
an internal bus to communicatively link the direct power management interface to the devices.

14. The computing platform of claim 10, wherein the devices comprise internal devices on a chip comprising the PMU.

15. The computing platform of claim 10, wherein the devices comprise external devices coupled to the PMU via an input/output interface.

16. The computing platform of claim 10, further comprising:
internal voltage regulators on a chip comprising the one or more processor cores.

17. The computing platform of claim 16, wherein each of the devices has an associated one or more internal voltage regulators.

18. The computing platform of claim 10, wherein the one or more processing cores, the PMU, and the direct power management interface are part of a system-on-chip.

19. An apparatus, comprising:
a processor to execute an operating system having a power management framework to issue power state changes to the processor and to devices coupled to the processor;
a power management unit (PMU) to control power provided to the devices; and
a power management interface coupled between the PMU and the devices to process power requests from the devices and to issue power commands to the devices, wherein the PMU can change device power states without going through the operating system power management framework, the PMU to compare a power state change request from the power management interface for a first device of the devices to an operating system power management (OSPM) power state change request from the power management framework to for priority, the PMU to generate an instruction to fulfill the OSPM power state change request when the OSPM power state change request has priority over the power state change request for the first device, and the PMU to determine a power state change for the power state change request for the first device when the power state change request for the first device has priority over the OSPM power state change request, the instruction or the power state change to control an amount of power supplied to the first device, and the PMU to fulfill the instruction or the power state change to control the power provided to the devices.

20. The apparatus of claim 19, further comprising a plurality of internal voltage regulators to provide the power to the devices.

21. The apparatus of claim 19, wherein the PMU comprises power management policies for managing power provided to the devices.

* * * * *